Patented Mar. 2, 1943

2,312,756

UNITED STATES PATENT OFFICE 2,312,756

PROCESS FOR THE PREPARATION OF DE-OILED SLUDGE IN COMBINATION WITH ACID RECOVERY

Robert P. Ferguson, Cranford, and Insley P. Jones, Basking Ridge, N. J., assignors to Standard Oil Development Company, a corporation of Delaware No Drawing. Application July 10, 1940, Serial No. 344,774

6 Claims. (Cl. 196—40)

This invention relates to improvements in the art of refining petroleum oils and relates particularly to the separation of a deoiled tar, sulfuric acid and oil from an acid sludge formed by treating a petroleum oil with sulfuric acid.

An acid sludge is formed when a petroleum oil is reacted with sulfuric acid of high concentration. The acid sludge thereby formed is generally allowed to separate and settle below the treated oil layer and thereafter removed. This acid sludge may then be processed for recovery of the unreacted acid by diluting with water and allowing the mixture to separate into two or more phases (tar, weak acid and oil under certain conditions). The amount of dissolved carbonaceous material in the acid phase usually decreases with decreased acidity and in order to obtain high concentrating yields, it is desirable to have this content of carbonaceous material as low as possible. However, when the acidity of this phase is lower than 25%, difficulties are frequently encountered in that stable emulsions are formed resulting in little or no acid recovery. In addition, the concentrating costs increase with decreasing acidity of this phase. Consequently the normal practice in sludge separation consists in employing sufficient water to produce an acid phase of 25-40% sulfuric acid content. This procedure gives high acid recoveries, dissolved carbon contents that are not excessive and moderate concentrating costs. This procedure is limited, however, in that it can only be applied effectively to sludges from naphthas and light lubricating oil treatments as little or no acid is recovered from viscous sludges from heavy lubricating oils.

Consequently the practice has been to dispose of these heavy sludges by fluxing with a light oil and burning or burning directly in special burning equipment. This method of disposing of these sludges is an expensive operation, and results in boiler corrosion and atmospheric pollution.

It is an object of our invention to provide a method whereby sulfuric acid of high acid and low carbon content may be readily recovered from an acid sludge obtained on treating the viscous lubricating oil stocks.

Another object of our invention is to recover from the acid sludge layer both the entrained oil and an oil free thermo plastic tar which is suitable for use in the preparation of plasticizers and rubber-like plastics.

According to this invention a viscous lubricating oil stock, for example a heavy Colombian distillate of 77 seconds Saybolt viscosity at 210° F., is treated with 54 lbs. of 98% sulfuric acid per 100 gallons of oil. The temperature maintained during the treating step is about 100° F. The mixture of oil and sulfuric acid is agitated by blowing with air or by the use of a mechanical stirrer for sufficient time to complete the reaction between the acid and oil. It is not the intention to limit this invention to the particular crude oil distillate or to the particular amounts of sulfuric acid that is given for illustration. After the mixture has been agitated for 10 to 35 minutes, preferably 25 to 35 minutes, water equivalent to 5 to 10% of the volume of the sludge formed is added at a uniform rate over a period of 5 to 15 minutes then the agitation is continued for at least 5 minutes preferably 5 to 20 minutes longer. The mixture is then settled to separate the sludge and treated oil and the sludge withdrawn. Additional water, equivalent to 0 to 15% of the volume of the sludge may then be incorporated in the sludge and the mixture settled at a temperature of 225-250° F. It may sometimes be desirable to maintain the mixture under a pressure of about 25 lbs. in order to reduce the evaporation losses of water.

A three layer separation is thereby obtained, one an oil layer containing a small amount of suspended sulfuric acid (treated oil entrained in the sludge), one an intermediate tar layer which is suitable for use in the preparation of plasticizers and rubber-like plastics, and the bottom layer of the diluted sulfuric acid. The separated tar may be treated with solvents to remove any trace of oil left therein. The solvents that may be used are liquefied hydrocarbons that are normally gaseous at room temperatures, methyl alcohol, etc. The separated acid usually contains from 58 to 66% of sulfuric acid and about 1% of carbon which carbon content may be further reduced on concentrating the acid to higher acidity or may be substantially removed by treating with nitric acid.

This separated acid may be concentrated to 88% acidity by conventional methods such as hot air blowing or vacuum concentration. The yield from this operation is of the order of 92% or higher while the carbon content of the concentrated acid is about 0.8%. The resulting acid is suitable for use in treating other petroleum products as such or after being fortified to 92 to 96% sulfuric acid concentration.

The process was described with reference to batch treating of lubricating oils and batch regeneration but it is obvious that this process may be run continuously. The essential features of the invention are that the initial addition of water must be made with vigorous agitation in order to intimately incorporate the water in the sludge and the acid concentration of the resulting separated sludge must be 58 to 66% to obtain the maximum recovery of the acid and tar.

The results obtained by the thorough mixing of first quantity of water with the mixture of acid and oil that is being treated, followed by a further addition of the water, when needed is illustrated in the following Table 1. The process usually employed is the one where the required amount of water is added in periods of 4–5 minutes to the sludge-oil mixture while undergoing vigorous agitation and then only agitated another 3 to 6 minutes and no acid is recovered. However, in those cases where the agitation following water addition was continued for 16 to 18 minutes, according to this invention, good acid recoveries were obtained. Furthermore, where water was added slowly for 16 minutes with vigorous agitation without any further agitation such as blowing with air, no separation of the acid was obtained:

When finally settling at temperatures in the neighborhood of 220° F. the effects of the addition of various quantities of water to the sludge is illustrated in the following Table 2. This sludge was initially mixed with 10% by volume of water during the acid treating operation and then mixed with 0 to 80% of additional water for the final separation of the acid, tar and oil. Results are also given of similar operations in which the final separation was carried out at 250° F. with a pressure of 15 lbs. per square inch to prevent loss of water by evaporation with lower yields of the sulfuric acid that was separated out. The separation of the acid is shown to be dependent on the quantities of water added i. e. when sufficient water is added to obtain a dilute acid of 58% to 66% concentration, at least 60% of an acid with a carbon content not substantially over 1% is recovered. The total quantity of water added usually amounts to 15% to 25% of the sludge volume.

TABLE 1

SEPARATION OF HEAVY LUBE SLUDGES

*Effect of water collecting operation on acid recovery yields*

|  |  | Normal | Modified | Normal | Modified | Modified |
|---|---|---|---|---|---|---|
| Lube treating operation: | | | | | | |
| Distillate | viscosity at 100° F | 630 | 630 | 630 | 630 | 630 |
| Treating temperature | °F | 108 | 109 | 110 | 105 | 110 |
| Acid treat | lbs. 98% acid/100 gals | 40 | 40 | 40 | 40 | 40 |
| Water collect | volume percent of sludge | 10.0 | 10.0 | 10.0 | 10.0 | 7.0 |
| Time cycle: | | | | | | |
| Apply acid | minimum | 20 | 20 | 24 | 24 | 25 |
| Blow on acid | do | 30 | 30 | 30 | 30 | 30 |
| Apply water | do | 4 | 4 | 5 | 5 | 16 |
| Blow on water | do | 3 | 18 | 6 | 16 | 0 |
| Sludge separation: | | | | | | |
| Water addition | volume percent | 10 | 11 | 10 | 10 | 10 |
| Settling temperature | °F | 225 | 225 | 225 | 225 | 225 |
| Acid recovery | weight percent (1) | 0 | 78 | 0 | 65 | 2 |

(1) Based on acid available in sludge.

TABLE 2

SEPARATION OF HEAVY LUBE SLUDGES

*Effect of acidity of acid phase and temperature of settling on acid recovery*

LUBE TREATING OPERATION

Colombian distillate_____V/100° F__ 900
Acid treat_____lbs. 98% acid/100 gals__ 40
Water collect_____vol. percent of sludge__ 10

| Sludge settling operation | | Separated acid | |
|---|---|---|---|
| Settling temp. °F. | Water addition | H²SO | Recovery 1 |
| | Volume Per cent | Per cent | Per cent |
| 200 | 0 | 68.0 | 20.0 |
| 220 | 10 | 65.4 | 62.1 |
| 220 | 20 | 58.0 | 61.6 |
| 220 | 40 | 46.3 | ² 49.9 |
| 220 | 80 | 33.8 | ² 28.6 |
| ³ 250 | 0 | 68.1 | 43.4 |
| 250 | 10 | 64.3 | 69.7 |
| 250 | 20 | 55.2 | 64.3 |
| 250 | 40 | 44.7 | 42.1 |
| 250 | 80 | 31.9 | 24.6 |

[1] Weight per cent, based on acid available in the sludge.
[2] Weak acid dispersed throughout tar phase.
[3] +15# pressure.

We claim:

1. In the refining of petroleum hydrocarbon oils by treating the petroleum hydrocarbon oil with sulfuric acid to prepare a thermoplastic tar, the steps which comprise treating a viscous lubricating oil with concentrated sulfuric acid at a temperature of about 100° F., agitating the mixture for 10 to 35 minutes while adding slowly at a uniform rate, 5 to 10% of water based on the volume of sludge formed, allowing the mixture to settle, separating the sludge from the treated oil, adding 10% to 20% of water to the separated sludge, maintaining the mixture at a temperature of 225° to 250° F. and separating the sulfuric acid, the tar and the oil.

2. In the acid refining of hydrocarbon oils according to claim 1, the mixture of concentrated sulfuric acid and oil is mixed for 25 to 35 minutes.

3. In the refining of petroleum hydrocarbon oils by treating the petroleum hydrocarbon oil with sulfuric acid to prepare a thermoplastic tar, the steps which comprise treating a viscous lubricating oil with concentrated sulfuric acid at a temperature of about 100° F., agitating the mixture for 5 to 15 minutes while adding slowly at a uniform rate, 5 to 10% of water based on the volume of sludge formed, continuing the agitation for 5 to 20 minutes, allowing the mixture to settle, separating the sludge, adding 10% to 20% of water to the separated sludge to dilute the acid to 58% to 66% concentration, maintaining the mixture at a temperature of 225° to 250° F., separating the sulfuric acid, the tar and the oil and concentrating the sulfuric acid to a strength of at least 89.1%.

4. In the refining of petroleum hydrocarbon oils by treating the petroleum hydrocarbon oil with sulfuric acid to prepare a thermoplastic tar, the steps which comprise treating a viscous lubricating oil with concentrated sulfuric acid at a temperature of about 100° F., agitating the mixture for 5 to 15 minutes while adding slowly at a uniform rate, 5 to 10% of water based on the volume of sludge formed, continuing the agitation for at least 5 minutes, allowing the mixture to settle, separating the sludge, adding 10% to 20% of water to the separated sludge to dilute the acid to 58% to 66% concentration, maintaining the mixture at a temperature of 225° to 250° F., separating the sulfuric acid, the tar and the oil and treating the tar with a solvent to remove the oil.

5. In the refining of petroleum hydrocarbon oils by treating the petroleum hydrocarbon oil with sulfuric acid to prepare a thermoplastic tar, the steps which comprise treating a viscous lubricating oil with concentrated sulfuric acid at a temperature of about 100° F., agitating the mixture for 10 to 35 minutes while adding slowly at a uniform rate, 5 to 10% of water based on the volume of sludge formed, allowing the mixture to settle, separating the sludge, adding 10% to 20% of water to the separated sludge to dilute the acid to 58% to 66% concentration, and reduce the carbon content to about 1%, maintaining the mixture at a temperature of 225° to 250° F. and separating the sulfuric acid, the tar and the oil.

6. In the refining of petroleum hydrocarbon oils according to claim 5, the separated acid is concentrated and the carbon content reduced to a value of under 0.8%.

ROBERT P. FERGUSON.
INSLEY P. JONES.